United States Patent [19]

Stephenson

[11] Patent Number: 4,995,575
[45] Date of Patent: Feb. 26, 1991

[54] WING TRAILING EDGE FLAP MECHANISM

[75] Inventor: Martin F. Stephenson, Issaquah, Wash.

[73] Assignee: The Boeing Company, Seattle, Wash.

[21] Appl. No.: 365,994

[22] Filed: Jun. 14, 1989

Related U.S. Application Data

[63] Continuation-in-part of Ser. No. 251,042, Sep. 26, 1988, abandoned, which is a continuation of Ser. No. 121,365, Nov. 16, 1987, abandoned.

[51] Int. Cl.$^5$ .............................................. B64C 9/16
[52] U.S. Cl. .................................................. 244/216
[58] Field of Search ................ 244/215, 216, 218, 219

[56] References Cited

U.S. PATENT DOCUMENTS

| | | | |
|---|---|---|---|
| 1,917,428 | 7/1933 | Burnelli | 244/214 |
| 2,202,430 | 5/1940 | Rebeski | 244/216 |
| 2,235,146 | 3/1941 | Fowler | 244/216 |
| 2,348,150 | 5/1944 | Richter | 244/42 |
| 2,426,785 | 9/1947 | Naumann | 244/216 |
| 2,579,534 | 12/1951 | Anderson et al. | 244/216 |
| 2,661,166 | 12/1953 | Gordon | 244/42 |
| 2,791,385 | 5/1957 | Johnson | 244/42 |
| 2,836,380 | 5/1958 | Pearson | 244/42 |
| 3,180,591 | 4/1965 | Ikeda et al. | 244/216 |
| 3,438,599 | 4/1969 | Welzen | 244/42 |
| 3,480,235 | 11/1969 | Multhopp | 244/42 |
| 3,568,957 | 3/1971 | Wood | 244/42 |
| 3,698,664 | 10/1972 | Bonney | 244/42 |
| 4,248,395 | 2/1981 | Cole | 244/216 |
| 4,361,299 | 11/1982 | Sharrock | 244/216 |
| 4,405,105 | 9/1983 | Dilmaghan et al. | 244/215 |
| 4,471,928 | 9/1984 | Cole | 244/215 |
| 4,605,187 | 8/1986 | Stephenson | 244/216 |
| 4,669,687 | 6/1987 | Rudolph | 244/215 |
| 4,702,442 | 10/1987 | Weiland et al. | 244/216 |
| 4,725,026 | 2/1988 | Krafka et al. | 244/219 |

FOREIGN PATENT DOCUMENTS 732918  3/1943  Fed. Rep. of Germany ...... 244/216

OTHER PUBLICATIONS

*Interavia*, Jan. 1982, p. 39, illustration of A310 slot and spoiler installations, flap section at tracks two and five.

*Primary Examiner*—Charles T. Jordan
*Attorney, Agent, or Firm*—William C. Anderson; B. A. Donahue

[57] ABSTRACT

Actuation and support mechanisms for wing trailing edge flap systems wherein each flap system has a streamwise or chordwise pair of geometrically similar flap support assemblies. Each of the flap support assemblies has a chordwise aligned cantilever support beam fixedly attached to wing structure. The beam incorporates multiple cam tracks for providing guidance and support to a movable dual carriage assembly upon which a wing trailing edge flap assembly is mounted. The dual carriage assembly comprises a fore-carriage which is articulatably connected to an aft-carriage. The wing trailing edge flap assembly is mounted upon the aft-carriage. Both the fore-carriage and the aft-carriage are individually supported by rollers constantly engaging a separate cam track for each of said carriages. For actuation of the dual carriage assembly and the wing trailing edge assembly mounted thereon, a ball screw drive mechanism is incorporated between the cantilever beam and the dual carriage assembly.

23 Claims, 7 Drawing Sheets

Fig. 7

WING TRAILING EDGE FLAP MECHANISM

CROSS REFERENCE TO RELATED APPLICATIONS

This is a continuation-in-part of U.S. patent application Ser. No. 07/251,042 filed Sept. 26, 1988, and now abandoned, which was a continuation of U.S. patent application Ser. No. 07/121,365, filed Nov. 16, 1987, and now abandoned.

BACKGROUND AND SUMMARY OF THE INVENTION

The present invention relates to a trailing edge flap extension mechanism for increasing the overall planform area of the main wing of an aircraft. More particularly, the invention pertains to a cam track guided angle-of-incidence means for increasing the overall wing airfoil camber whereby the overall lifting capability or coefficient of lift of the wing may be increased during the take-off or landing modes of the aircraft.

As evidenced by U.S. Pat. No. 4,605,187, issued Aug. 12, 1986, to Stephenson, considerable development effort has been applied to find ways to support both the leading edge and the trailing edge flap mechanisms internally of the wing airfoil envelope. The Stephenson invention eliminates the aerodynamic drag penalty associated with large fairings usually required for housing the leading edge and the trailing edge flap support structure and drive mechanisms.

With the advent of increasingly higher aspect ratio wings and thinner wing airfoil sections, problems are encountered in using an internal arrangement for mounting the support and operating mechanisms of both the leading edge and the trailing edge flap systems. These higher aspect ratio wing designs also require relatively powerful high-lift devices for slow speed flight, e.g., the landing or take-off mode of airplane operation. However, the wings no longer have the necessary internal volume for completely containing the actuation and drive mechanisms for the high-lift devices. Further, in order to avoid excessive wing flutter in these latest high aspect ratio wing designs, both their stiffness and strength have to be increased. The strength and stiffness can be substantially increased by increasing the chord width of the structural wing box. Thus, it is very important to locate the wing box spars as far apart as possible while still retaining adequately sized flaps. If the space allotted for flaps and their associated support is too great, then the strength and stiffness can only be increased by substantially increasing the thickness of the upper and lower wing panels and the front and rear spar webs. However, these methods result in significant weight penalties.

The present invention is directed towards those airplane designs incorporating high aspect ratio wings having relatively thin airfoil sections with spanwise bending flexibility. More particularly, the present invention provides both an improved structural wing box and an improved external support mounting and operating mechanism for the high-lift systems.

With respect to a preferred embodiment of the invention relating to a wing trailing edge flap system, the external support mounting comprises a cantilever beam which is fixedly attached to wing structure. The cantilever beam provides for a relatively long travel of the trailing edge flap in combination with a good functional positioning operation of the flap elements. This is achieved by an extension and retraction mechanism through its overall travel range of actuated positions, i.e., the extension function of the mechanism accomplishes a good rearward projection and rotation of the flap elements relative to the main wing chord plane.

The wing trailing edge flap system incorporates a dual carriage flap support mechanism and a ball screw actuation mechanism for extension/retraction operation of the trailing edge flap elements. The dual carriage comprises a fore-carriage and an aft-carriage articulatably connected thereto. The fore-carriage is actuated by a ball screw drive mechanism and the aft-carriage has a double-slotted flap mounted thereon. Both the fore and the aft-carriages are individually roller-supported on separate cam tracks which are integral with and positioned on either side of a cantilever support beam fixedly attached to the main wing structure.

A streamlined fairing covers the entire dual carriage support and ball screw actuation mechanism.

DESCRIPTION OF THE PREFERRED EMBODIMENTS

Figure 1:
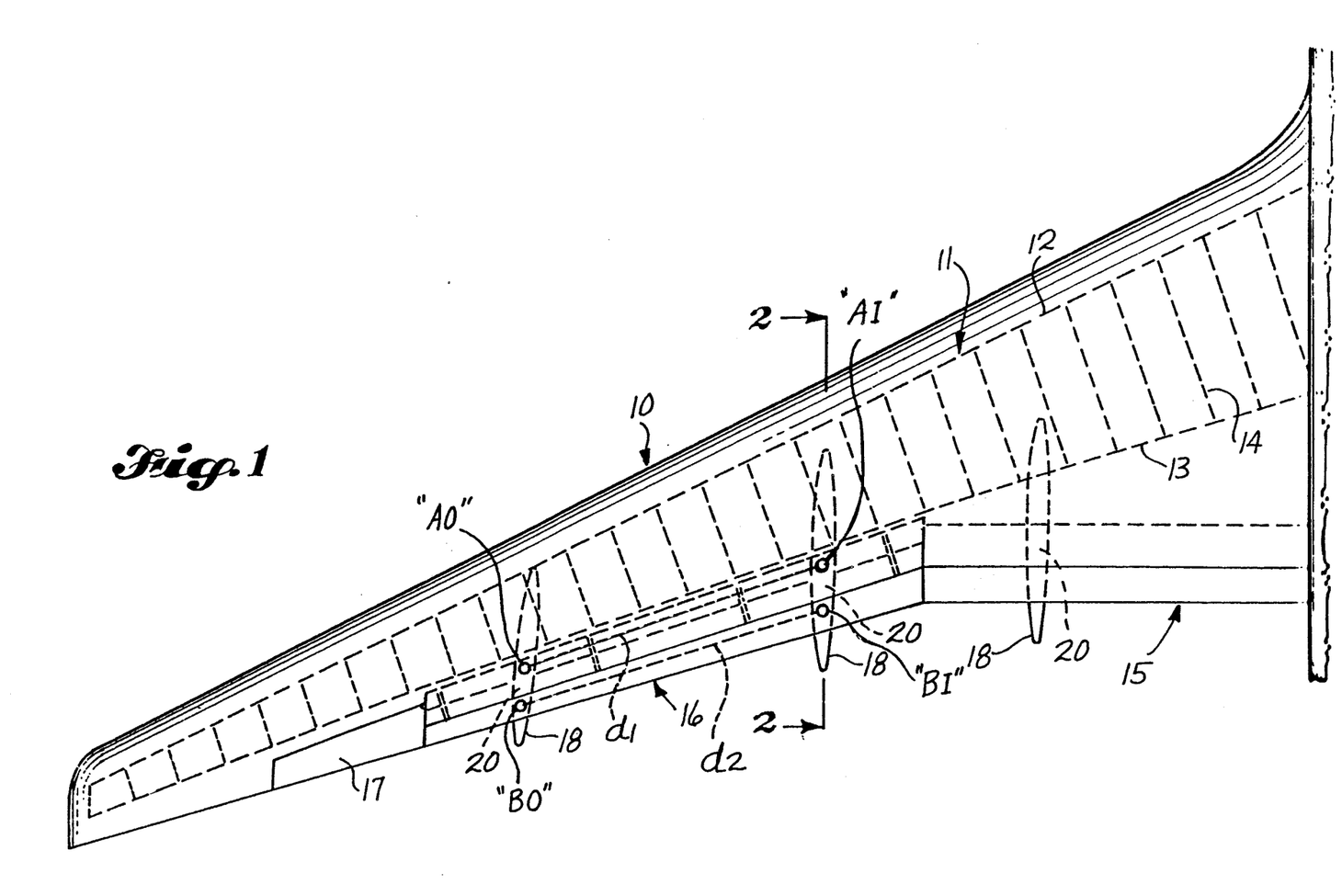
FIG. 1 is a top plan view of a left wing of an aircraft and the wing trailing edge flap system.

FIG. 1 is a top plan view of a highly tapered, left wing 10 with an aspect ratio of approximately 10 and to which is added an inboard Yehudi section. The wing 10 is swept-back approximately 27 degrees on an aircraft (not shown). The wing 10 has a wing box structure 11, depicted in dashed lines, comprising a front spar 12, a rear spar 13, and interconnecting ribs 14.

The trailing edge flap system of the wing comprises an inboard dual flap system 15, an outboard dual flap system 16, and an outboard aileron 17. Each dual flap system has a chordwise or streamwise, pair of geometrically similar flap support assemblies 20 (the details of which are illustrated in the figures as hereinafter described). Each flap support assembly 20 is enclosed within a streamlined fairing 18, except for the wing root flap support assembly which is housed within the fuselage.

A first and preferred embodiment of the flap support assembly 20 is depicted in FIGS. 2, 2A, 3, and 4. This streamwise oriented flap support assembly 20 is geometrically similar to all those utilized in the wing trailing edge flap system of the present invention.

Referring to FIGS. 1-6, the outboard dual flap system 16, comprises a fore-flap 16A and an aft-flap 16B disposable within an upper trailing edge panel 10A and a lower trailing edge panel 10B of the wing 10. As shown in FIG. 1, the dual flap system 16 features two chordwise or longitudinally aligned flap support assemblies 20 which are mounted beneath the lower surface of the wing 10 and enclosed by fairings 18.

The flap support assembly 20 comprises a longitudinally aligned elongated beam 21, the forward end of which is shown to the left in FIGS. 2, 2A, 3 and 4. The beam 21 is fixedly connected at a fitting 22 to the undersurface of the wing 10. The beam 21, through an intermediately located attachment fitting 23, is fastened to the rear spar 13 of the wing box structure 11. The rearward portion of the beam 21 is cantilever suspended from the fitting 23.

The structurally mounted cantilever beam 21 incorporates a multiple or quadra-cam track means 24 for guiding a dual carriage assembly 30 which supports the wing trailing edge dual flap assembly 16. The quadra-cam track means 24 comprises a first lower flange cam track 26 and a second upper cam track 27. The cam tracks 26 and 27 are arranged, as shown in the top planform view of FIG. 3, symmetrically on either side of the chordwise centerline of the flap support beam 21, thereby forming mirror images of each other. Either or both cam tracks 26, 27 could be in the form of flanges, as shown, or as channels, rails, etc. (not shown).

The curvature of the cam tracks 26, 27 is designed to control both the rearward extension and angular positioning of the dual carriage assembly 30 together with the outboard dual flap system 16.

Figure 3:
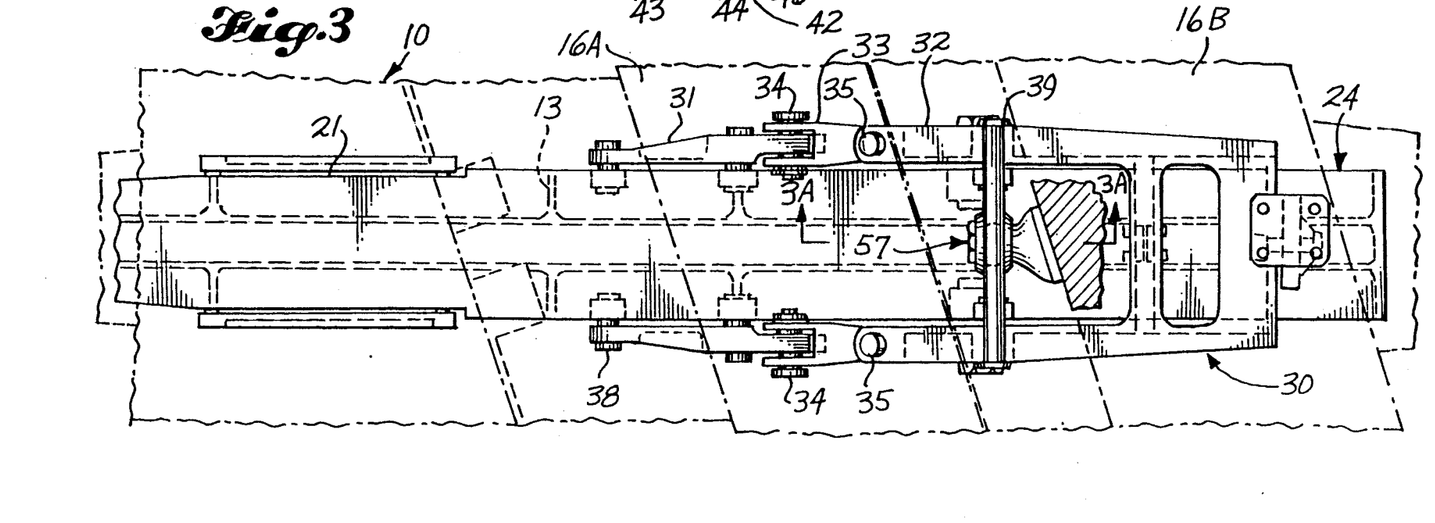
FIG. 3 is a top plan view of the flap support assembly shown in FIG. 2A.

The dual carriage assembly 30 comprises a fore-carriage 31 and an aft-carriage 32. These carriages are interconnected by a pair of side-by-side or parallel aligned universal links 33, as shown in FIG. 3, which straddle the cantilever beam 21. Each of the universal links 33 is connected to the fore-carriage 31 through a horizontally aligned pin joint 34 and is connected to the aft-carriage 32 through a vertically aligned pin joint 35.

The fore-carriage 31 has cam following rollers 38 engaging the first lower flange cam track 26. The aft-carriage 32 has cam following rollers 39 engaging the second upper flange cam track 27. For stabilization and guidance of the carriages 31 and 32, the cam follower rollers 38 and 39 engagingly straddle the cam track flanges 26, 27 on both sides of the longitudinally aligned flap support cantilever beam 21.

The fore-carriage 31 is driven by a mechanical linear actuator or ball screw drive unit 42; basically a motion transfer mechanism that converts a rotary or torque input into a thrust or linear output. The ball screw drive unit 42 comprises a gear box drive unit 43 and a ball screw drive shaft 45 which is universally connected at 44 to the drive unit 43. A ball nut 46 is affixed to the centerline of the fore-carriage 31 through a universal connection 48 and the ball nut 46 moves along the drive screw 45 upon rotation thereof. However, the ball nut 46 does not rotate as it travels along ball screw 45.

Referring to FIG. 1, the ball screw drive unit 42 is located spanwise on the wing at each flap support assembly 20. These spanwise series of ball screw drive units 42 have their gear boxes 43 interconnected by a high speed torque shaft (not shown) which is driven by a power drive unit generally located in either the wheel well or the fuselage of the airplane (not shown).

The universal articulation of the dual carriage assembly 30, in combination with the roller engaging cam track means 24 on both sides of the cantilever beam 21, provides for a non-binding, translatable movement of the outboard dual flap system 16. This is especially important in high subsonic-speed aircraft having high aspect ratio wings which are relatively thin and flexible because the in-flight aerodynamic loads experienced by the aircraft during take-off or landing impose substantial bending forces on the flap elements and their extension mechanism. Therefore, the combination of the quadra-cam tracks and the universally articulated dual carriage assembly 30 provide for unrestricted extension/retraction movement of the wing trailing edge, outboard flap system 16.

Figure 2:
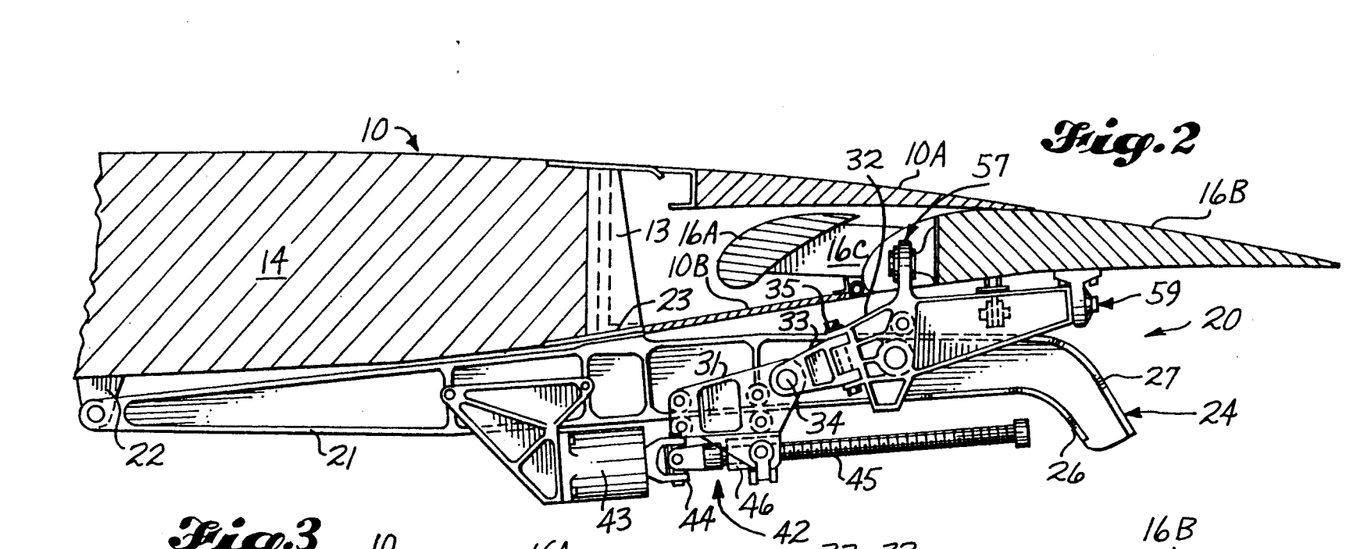
FIG. 2 is a side view of a flap support assembly taken in the direction indicated by 2—2 in FIG. 1.
Figure 2A:
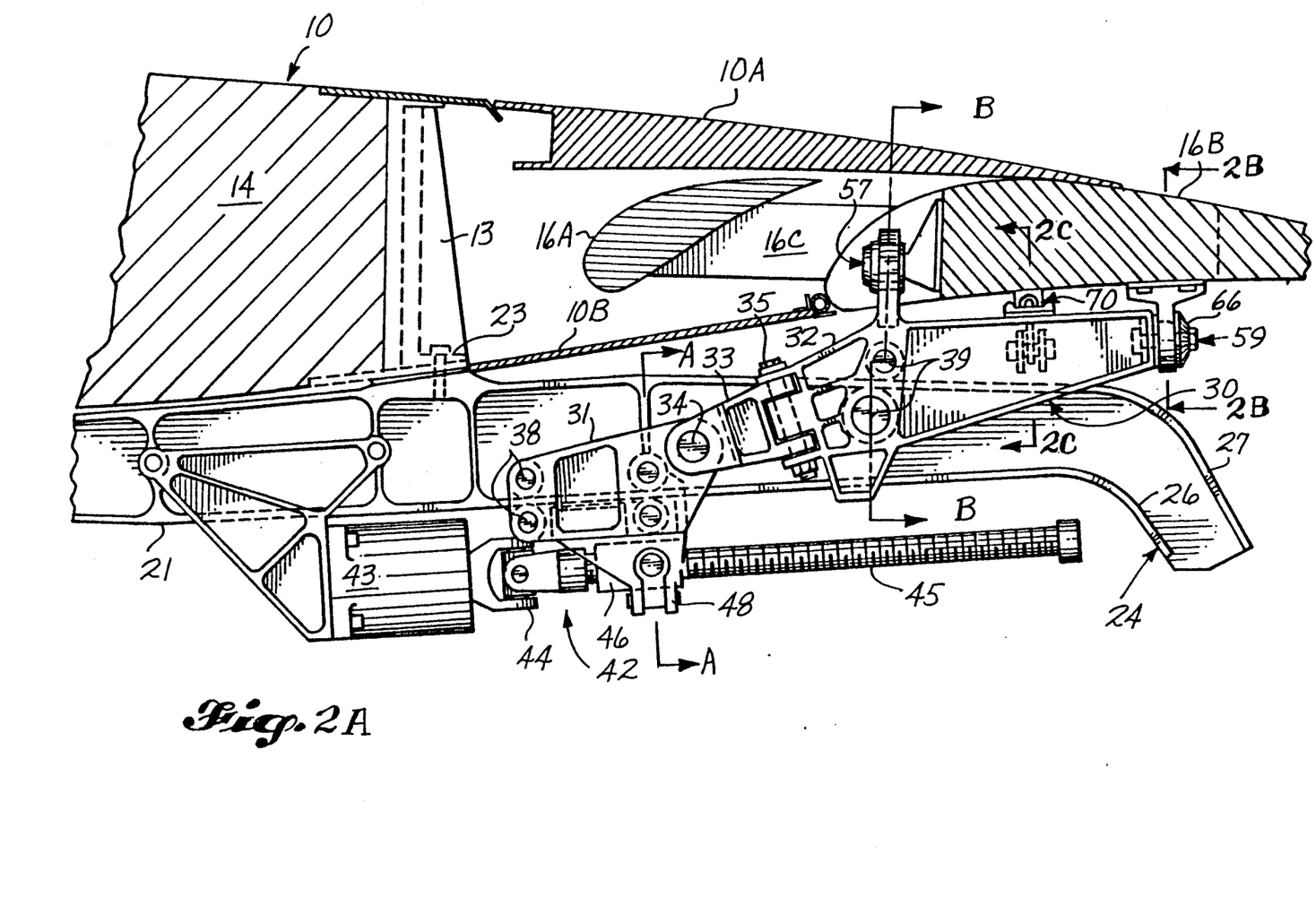
FIG. 2A is an enlarged side view of the flap support assembly shown in FIG. 2.

Referring to FIGS. 2, 2A, and 3, the outboard dual flap assembly 16 is adapted to nest within the envelope of the fixed wing airfoil section when the assembly is in the fully retracted position. An aligned continuation of the upper and lower skin surfaces of the fixed wing airfoil section is thereby formed. From this fully retracted position, initial rearward travel or extension movement of the outboard dual flap assembly 16 is approximately in a straight line path as determined by the relatively straight section of cam tracks 26, 27.

Figures 4, 5, 6:
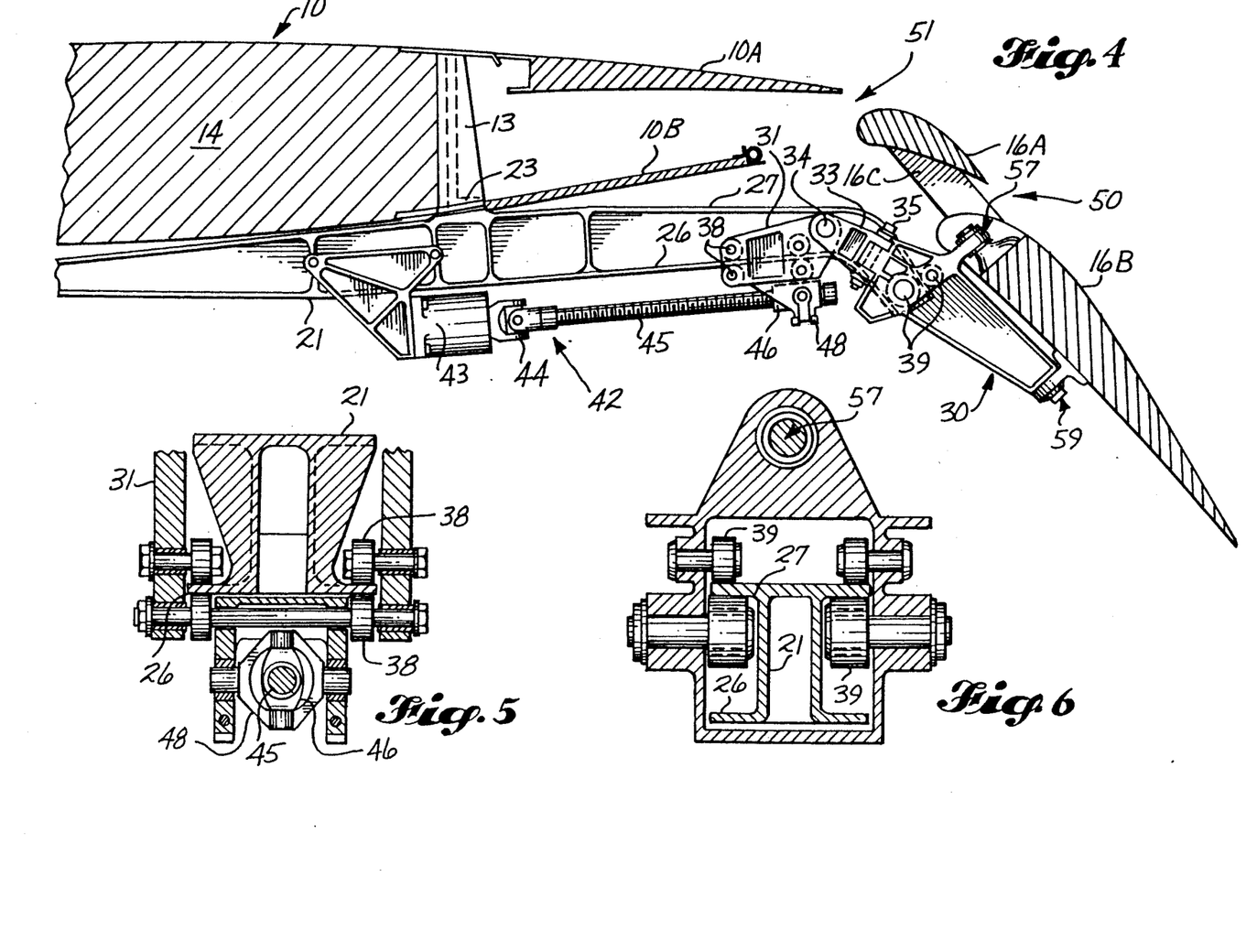
FIG. 4 is a side view similar to FIG. 2 with the flap assembly in an extended position.
FIG. 5 is a cross-sectional view taken in the direction indicated by A—A in FIG. 2A.
FIG. 6 is a cross-sectional view taken along the staggered line and in the direction indicated by B—B in FIG. 2A.

In other words, this initial rearward travel extends the outboard dual flap assembly 16 in approximate alignment with the chord plane of the wing 10 for a horizontal distance approximately equivalent to one-half of the overall chord length of the aft-flap 16B. From this extended position rearwards, the fore-carriage 31 continues to move in a straight line while the aft-carriage 32 begins to move on a curved path dictated by the curvature of the upper flange cam track 27. As a consequence, the outboard dual flap assembly 16, which is mounted onto the aft-carriage 32, as at conventional forward and aft attachment means 57 and 59 (see FIG. 2A), begins to tilt to an increased angle-of-incidence that is controlled by the upper flange cam track 27. FIG. 4 shows the dual flap assembly 16 at maximum extension or terminus. In this position, the assembly is at a maximum angle-of-incidence.

Figure 2B:
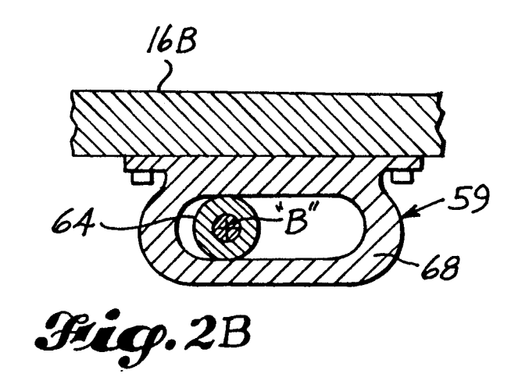
FIG. 2B is a cross-sectional view taken in the direction indicated by 2B—2B in FIG. 2A.
Figure 3A:
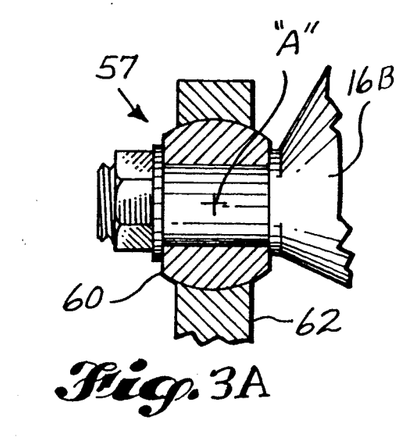
FIG. 3A is a cross-sectional view taken in the direction indicated by 3A—3A in FIG. 3.

FIGS. 3A and 2B show the conventional forward and aft attachment means 57 and 59, respectively, in greater detail. The forward attachment means 57 comprises a spherical joint 60 fixed to the aft-flap 16B. The joint 60 is supported by a means 62 which is affixed to or integral with the rear carriage 32. The aft attachment means 59 comprises a roller 64 attached to aft-carriage 32. The lateral motion of roller 64 is constrained by a slotted bracket 68 mounted to the aft-flap 16B (see FIG. 2B) and its axial motion is limited by a fastener 66 abuttingly contacting the bracket 68 (see FIG. 2A).

The combination of the attachment means 57 and 59 allows the aft-carriage 32 to rotate with respect to the aft-flap 16B about an axis joining a point "A" (centroid of the spherical joint 60) and a point "B" (center of the cross section of the end of roller 64). The aft-carriage 32 may also pivot about point "A" to the extent permitted by the slotted bracket 68. While point "B" (and therefore carriage 32), may pivot about point "A", it may not move vertically relative to the aft-flap 16B, as viewed in FIG. 2B.

This combination thus provides a means of allowing conical motion of the outboard dual flap system 16. As used herein "conical motion" refers to the skewed motion of the system 16, e.g., the aft-flaps 16B do not move in parallel. During this conical motion, an aft-flap 16B moves a greater distance at the inboard end of the wing 10 than at the outboard end. As the inboard and outboard aft-flaps 16B are extended, the distance between the points "AI", "AO" and the points "BI", "BO", i.e., the distances "$d_1$" and "$d_2$", must remain equal in three dimensions to prevent binding (see FIG. 1).

This spatial interrelationship is conventionally achieved by attaching the inboard and outboard beams 26 to the wing box 11 in a non-parallel arrangement (see FIG. 1). Further, since the rectilinear motion of each point "A" is, in part, determined by the first lower flange cam track 26 and the second upper cam track 27, there is a small lateral clearance between the tracks 26, 27 and the aft-carriage 32 to allow for any slight non-linearity of the motion of the aft-flaps 16B and for normal manufacturing tolerances (see FIG. 6). The provision of attachment means 57, 59 thus allows the outboard flap system 16 to reach the desired aerodynamic positions while still being attached to cam tracks rigidly attached to the wing box 11.

Figure 2C:
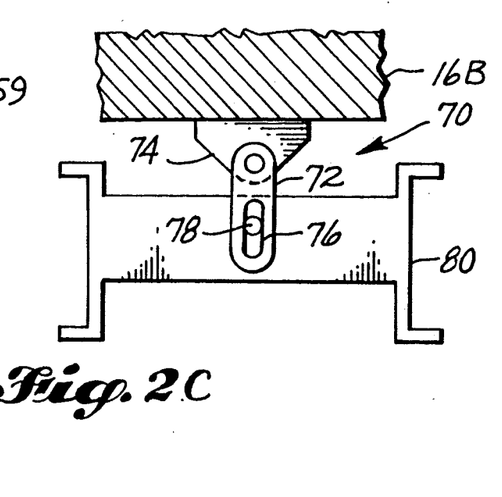
FIG. 2C is a cross-sectional view taken in the direction indicated by 2C—2C in FIG. 2A.

A conventional redundant link connection 70 is also provided. As shown in FIG. 2C, the connection 70 comprises a link 72 which is pivotably attached as by a pin joint 74 to the aft-flap 16B. The link 72 is formed with a slotted joint 76 which is slidably connected to a pin 78. The pin 78 is affixed to a structural member 80 forming part of the aft-carriage 32. The link connection 70 allows substantially the same motion provided with aft attachment means 59.

As shown in FIGS. 2, 2A, and 4, the fore-flap 16A is supported at a fixed predetermined distance forward of the nose section of the aft-flap 16B by an extension member 16C which serves to form a first aerodynamic slot 50 between the two flap sections at the fully extended position shown in FIG. 4. Further, at the fully extended position, the angle-of-incidence of the fore-flap 16A is increased in proportion to the angular movement of the aft-flap 16B due to their fixed interrelationship. Note also that a second aerodynamic slot 51 is exposed between the fore-flap 16A and the upper wing surface trailing edge member 10A when the assembly 16 is at its maximum extension.

In this preferred embodiment described supra, a support and extension mechanism has been developed for a fixed fore-flap 16A spaced a predetermined distance forward of an aft-flap 16B so as to form a double aerodynamic slotted flap assembly in the fully extended position shown in FIG. 4.

This first embodiment could raise problems which preclude its use. For example, this embodiment may not be useful if (i) the aft camber of the wing airfoil is increased to such an extent that the fixed fore-flap 16A interferes with either the upper trailing edge panel 10A or the lower trailing edge panel 10B during movement of the assembly 16, or (ii) there is concern about the close proximity of the aft edge of the lower trailing edge panel 10B to the second slot 51. If the panel 10B is too close, aerodynamic efficiency may be adversely affected.

Another problem encountered during extension of trailing edge flap systems is the achievement of desired angle-of-incidences of the individual flap elements at all intermediate positions as well as the fully extended position. This is especially important for multiple and slotted multiple trailing edge flap systems, i.e., those forming aerodynamic slots at all of the intermediate extension positions including the extreme extended position.

Figure 7:
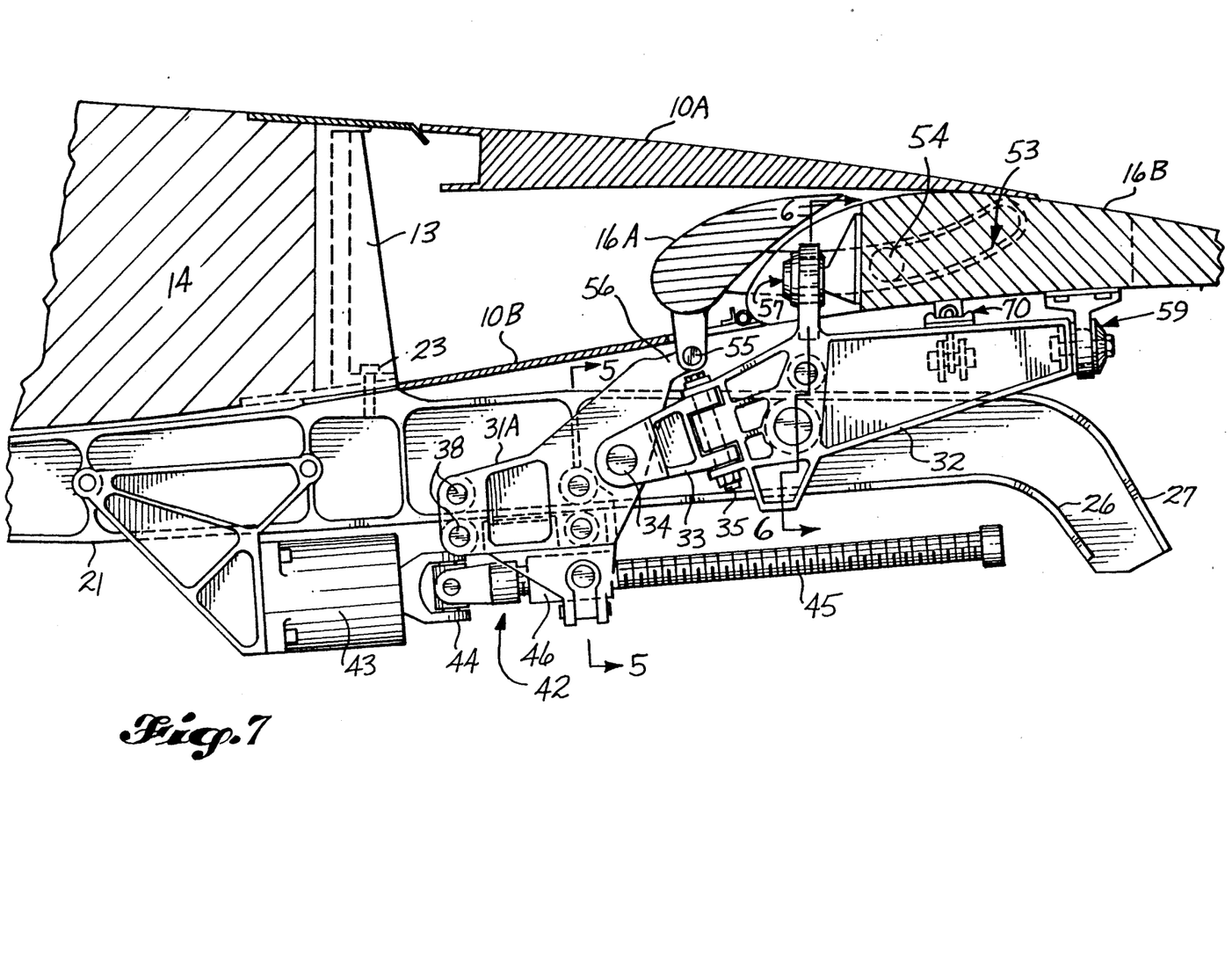
FIG. 7 is an enlarged side view of a second embodiment flap assembly incorporating a movable fore-flap.
Figure 8:
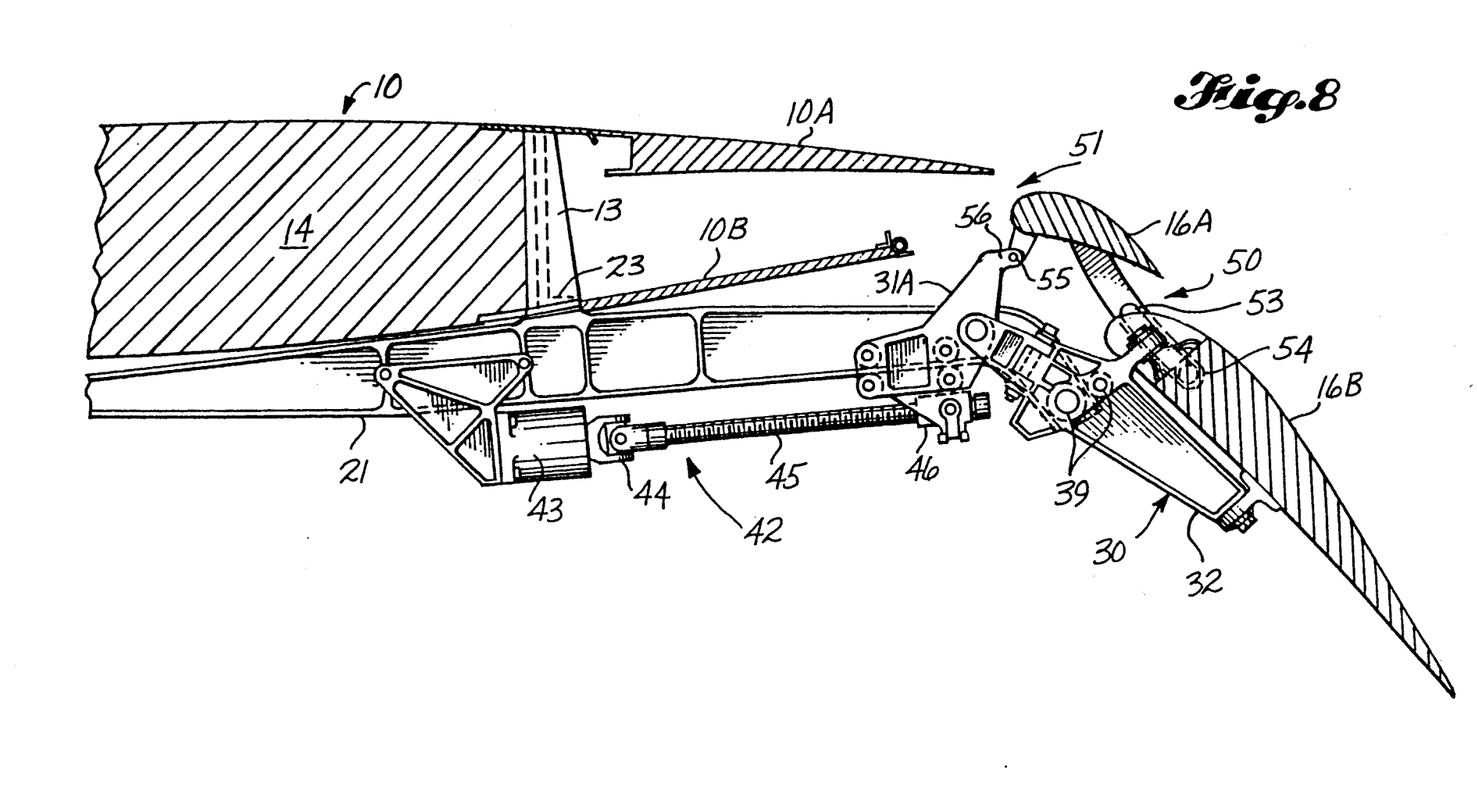
FIG. 8 is a reduced side view similar to FIG. 7 of the second embodiment with the flap assembly in an extended position.

FIGS. 7 and 8, show a second embodiment of the outboard dual flap system 16 of FIG. 1. Those elements that are similar to those previously described have like numerals. Where there are some differences in the elements they have been identified with different numerals. The primary difference between the first and second embodiments is that the fore-flap 16A is variable relative to the aft-flap 16B in the second embodiment.

FIG. 7 shows the fore-flap 16A nested against the aft-flap 16B in a retracted position. This allows more adequate clearance between the fore-flap 16A and the lower trailing edge panel 10B during extension of the dual flap assembly 16 to the position shown in FIG. 8.

The dual flap system 16 of FIGS. 7–8 comprises a fore-flap 16A supportably connected, through a cam track 53 and roller 54 arrangement, from the nose section of the aft-flap 16B. The cam track 53 is fixedly connected to fore-flap 16A. The roller 54 has its rotational axis fixed to the aft-flap 16B. The fore-flap 16A is pivotably connected at pivot 55 to a fore-carriage 31A. The fore-carriage 31A is a modification of the previously described carriage 31 in that it has an upper extension arm 56. As before, a primary aerodynamic slot 50 may be formed between the fore-flap 16A and the aft-flap 16B. Finally, a secondary aerodynamic slot 51 may be formed between the upper fixed trailing edge panel 10A and the fore-flap 16A.

In operation, as the ball screw driveshaft 45 extends the dual flap system 16, the downward deflection or rotation of the aft-carriage 32 relative to the fore-carriage 31A (about pin joint 34) is controlled by the degree of curvature of the second upper flange cam track 27. This results in the change in the angle-of-incidence of the aft-flap chord plane relative to the mean chord plane of the fixed wing airfoil section. Also, the angle-of-incidence of the fore-flap 16A relative to the aft-flap 16B is variably controlled during extension due to the curved slot or cam track 53 engaging the fixed roller 54 on the aft-flap 16B. Finally, the motion of the movable fore-flap 16A is programmed during extension of the dual flap assembly 16 such that both the primary aerodynamic slot 50 and the secondary aerodynamic slot 51 are modified.

The interconnecting mechanism between the fore-flap 16A and the combination of the aft-flap 16B and dual carriage assembly 30 functions to produce a proportionate translational and angular control movement of the fore-flap 16A relative to the aft-flap 16B. The degree of proportionate control can be modified by both the curvature of the cam track 53 and by a variation in length of the linkage connection 56 to the fore-carriage 31A.

To decrease aerodynamic drag, the streamlined fairings 18 enclose or house the flap support assembly 20 (see FIG. 1). The assembly 20 comprises the cantilever beam 21, the ball screw actuating mechanism 42, and the dual carriage assembly 30. The entire flap support assembly 20 protrudes below the undersurface of the wing, i.e., it is external to the fixed wing airfoil envelope. Therefore, to decrease aerodynamic drag, the flap support assemblies 20 are housed or enclosed within the streamlined fairing 18. Although not shown in the figures for reason of clarity, a forward section of the fairing 18 remains fixed while a rearward section is attached to and is simultaneously movable with translation of the dual carriage assembly 30 and the dual flap system 16 affixed thereto.

A third embodiment of the wing trailing edge flap system, described above, could obviously comprise just a single chordwise flap member 16B, i.e., without the fixed or movable fore-flap 16A shown in the first and second embodiments, respectively.

Changes and modifications in the specifically described embodiments can be carried out without departing from the scope of the invention which is intended to be limited only by the scope of the following claims.

What is claimed and desired to be secured by Letters Patent of the United States is:

1. Track and carriage means for the support and movement of dual auxiliary airfoils on a main airfoil, comprising:
    (a) an elongated beam mounted to said main airfoil and extending generally chordwise thereof;
    (b) said track means comprising a first and a second guide track affixed to said elongated beam;
    (c) said carriage means comprising a first carriage and a second carriage, said first and said second carriage being pivotably interconnected;
    (d) a first and a second pair of rollers mounted on said first carriage for constant engagement with said first guide track;
    (e) a third pair of rollers mounted on said second carriage for constant engagement with said second guide track;
    (f) said second carriage being affixed to said dual auxiliary airfoils, and
    (g) means for actuating said first and second carriages so as to move said dual auxiliary airfoils to an extended position relative to the main airfoil.

2. The combination of claim 1, further comprising: means for fixing a chordwise spaced apart relationship to define an aerodynamic slot between said dual auxiliary airfoils when said actuating means moves said dual auxiliary airfoils to said extended position.

3. The combination of claim 1, further comprising: means for variably controlling a chordwise spaced apart relationship between said dual auxiliary airfoils when said actuating means moves said dual auxiliary airfoils to said extended position.

4. The combination of claim 3, wherein said dual auxiliary airfoils comprise a fore-flap and an aft-flap, said fore-flap being pivotably connected to said first carriage, said control means comprising a cam track affixed to said fore-flap and a roller having its rotational axis fixed to said aft-flap, said roller bearing on said cam track as said actuating means moves said dual auxiliary airfoils to said extended position, whereby the chordwise spacing between said fore-flap and said aft-flap may be varied.

5. Track and carriage means for supporting and moving an auxiliary airfoil which generally completes the trailing edge contour of a main airfoil when said auxiliary airfoil is in a retracted position, said means comprising:
    (a) an elongated beam mounted beneath the trailing portion of said main airfoil and extending generally chordwise thereof;
    (b) dual track means affixed to said elongated beam, said dual track means comprising first and a second spaced apart guide track;
    (c) dual carriage means comprising a first carriage and a second carriage, said first and said second carriages being pivotably interconnected, said second carriage being affixed to said auxiliary airfoil;
    (d) a first and a second pair of rollers mounted on said first carriage constantly engaging said first guide track;
    (e) a third pair of rollers mounted on said second carriage constantly engaging said second guide track, and
    (f) actuator means for imparting movement to said first and second carriages along said first and second guide tracks, whereby the auxiliary airfoil is moved between a retracted position, wherein said auxiliary airfoil completes the trailing edge contour of said main airfoil, and a fully extended position, wherein said auxiliary airfoil is displaced rearwardly and deflected downwardly relative to said main airfoil.

6. Means for supporting and moving dual auxiliary airfoils relative to a main airfoil, said dual auxiliary airfoils generally completing the trailing edge contour of said main airfoil when said dual auxiliary airfoils are in a retracted position, said supporting and moving means comprising:
    (a) an elongated beam mounted beneath the portion of said main airfoil and extending generally chordwise thereof;
    multiple guide track means being affixed to said elongated beam and comprising a first and a second guide track;
    (c) dual carriage means comprising a first carriage constantly engaging said first guide track, a second carriage constantly engaging said second guide track, said first and second carriages being pivotably interconnected, said second carriage being affixed to said dual auxiliary airfoils, and
    (d) actuator means for imparting movement to said dual carriage means along said multiple guide tracks and for moving said dual auxiliary airfoils relative to said main airfoil between a retracted position, whereby said dual auxiliary airfoils complete the trailing edge contour of said main airfoil, and a fully extended position whereby said dual auxiliary airfoils are displaced rearwardly and deflected downwardly relative to said main airfoil.

7. The combination of claim 6, further comprising: means for fixing a chordwise spaced apart relationship between said dual auxiliary airfoils to define an aerodynamic slot therebetween when said actuating means moves said dual auxiliary airfoils to said extended position.

8. The combination of claim 6, further comprising: means for variably controlling a chordwise spaced apart relationship between said dual auxiliary airfoils to define a variable aerodynamic slot therebetween when said actuating means moves said dual auxiliary airfoils to said extended position.

9. The combination of claim 8, wherein said dual auxiliary airfoils comprise a fore-flap and an aft-flap, said fore-flap being pivotably connected to said first carriage, said control means comprising a cam track affixed to said fore-flap and a roller having its rotational axis fixed to said aft-flap, said roller bearing on said cam track as said actuating means moves said dual auxiliary airfoils to said extended position, whereby said aerodynamic slot may be varied.

10. The combination of an airplane wing, a wing trailing edge flap generally completing the trailing edge contour of the airfoil section of said wing, and a wing trailing edge flap support mechanism, said mechanism comprising:
- (a) an elongated beam mounted beneath and proximate the trailing portion of said wing and extending generally chordwise thereof;
- (b) multiple guide track means being affixed to said elongated beam and comprising a first lower guide track and a second upper guide track;
- (c) a dual carriage assembly comprising a fore-carriage, an aft-carriage and a link pivotally interconnecting said carriages, said fore-carriage constantly engaging said first lower guide track and said aft-carriage constantly engaging said second upper guide track, said carriages being in series alignment along said elongated beam;
- (d) said flap being mounted on said aft-carriage, and
- (e) actuator means for moving said dual carriage assembly along said multiple guide tracks, whereby said flap is moved between a fully retracted position, wherein said flap completes the trailing edge contour of said wing, and a fully extended position wherein said flap is displaced rearwardly and deflected downwardly relative to the chord plane of said wing.

11. A wing trailing edge flap mechanism in combination with a main wing of an airplane comprising:
- (a) said main wing having a dual flap means comprising individual flap members which generally complete the trailing edge contour of the airfoil section of said main wing when said dual flap means is in a fully retracted position;
- (b) said mechanism comprising:
  - (i) an elongated beam mounted beneath the trailing portion of said main wing and extending generally chordwise thereof;
  - (ii) multiple guide track means being affixed to said elongated beam and comprising a lower guide track and an upper guide track;
  - (iii) a dual carriage assembly comprising a fore-carriage, an aft-carriage and a link pivotally interconnecting said carriages, said fore-carriage constantly engaging said lower guide track and said aft-carriage constantly engaging said upper guide track, said carriages being in series alignment on said elongated beam, said dual flap means being mounted on said aft-carriage, and
  - (iv) actuator means for imparting movement to said dual carriage assembly along said multiple guide track means whereby said dual flap means is moved between a fully retracted position, wherein said dual flap means completes the trailing edge contour of said main wing airfoil section, and a fully extended position, whereby said dual flap means is displaced rearwardly and deflected downwardly relative to the chord plane of the airfoil section of said main wing.

12. The combination of claim 11, further comprising: means for rigidly interconnecting said individual flap members in a chordwise spaced apart relationship to define a fixed aerodynamic slot therebetween when said actuating means moves said dual flap means to said extended position.

13. The combination of claim 11, further comprising: means operatively interconnecting said individual flap members for variably controlling a chordwise spaced apart relationship therebetween when said actuating means moves said dual flap means to said extended position.

14. The combination of claim 13, wherein said individual flap members comprise a fore-flap and an aft-flap, said fore-flap being pivotally connected to said first carriage, said control means comprising a cam track affixed to said fore-flap and a roller having its rotational axis fixed to said aft-flap, said roller bearing on said cam track as said actuating means moves said dual auxiliary airfoils to said extended position, whereby the chordwise spacing between said fore-flap and said aft-flap may be varied.

15. A support assembly in combination with a main wing of an airplane, comprising:
- (a) said main wing having an edge flap shaped to generally complete the trailing edge contour of the airfoil section of said main wing when said flap is in a fully retracted position;
- (b) a pair of flap support assemblies spaced apart spanwise beneath the trailing portion of said wing between the inboard and outboard end of said flap, each of said flap support assemblies comprising:
  - (i) a cantilever support beam;
  - (ii) a dual carriage assembly;
- (c) said beam having its forward portion fixedly attached beneath said main wing and its rearward portion extending in a chordwise or streamwise aft direction;
- (d) multiple guide track means being affixed to said beam and comprising a first lower guide track and a second upper guide track;
- (e) said dual carriage assembly comprising a fore-carriage, an aft-carriage and an interconnecting link for pivotally connecting said carriages, said fore-carriage constantly engaging said first lower guide track and said aft-carriage constantly engaging said second upper guide track, said carriages being in series alignment on said beam, said aft-carriage having said edge flap mounted thereon, and
- (f) actuator means for imparting movement to said dual carriage assembly along said multiple guide tracks, whereby said edge flap may be moved between a fully retracted position, wherein said edge flap completes the trailing edge contour of the airfoil section of said main wing, and a fully extended position, wherein said edge flap is displaced rearwardly and deflected downwardly relative to the chord plane of said airfoil section.

16. A support assembly in combination with a main wing of an airplane, said wing having a dual flap having individual flap members shaped to generally complete the trailing edge contour of the airfoil section of said wing when said dual flap is in a fully retracted position, said support assembly comprising:
- (a) a pair of geometrically similar dual flap support assemblies spaced apart spanwise beneath the trailing portion of said wing between the inboard and outboard ends of said dual flap, each of said dual flap support assemblies comprising:
  - (i) a cantilever support beam, and
  - (ii) a dual carriage assembly;
- (b) said support beam having its forward portion fixedly attached beneath the main wing structure of the airplane and its rearward portion cantilevered from said forward portion and extending in a chordwise or streamwise aft direction;

(c) multiple guide track means being affixed to said support beam and comprising a first lower guide track and a second upper guide track;

(d) said dual carriage assembly comprising a fore-carriage, an aft-carriage and an interconnecting link for pivotably connecting said carriages, said fore-carriage constantly engaging said first lower guide track and said aft-carriage constantly engaging said second upper guide track, said carriages being in series alignment on said support beam, said dual flap being mounted on said aft-carriage, and (e) actuator means for imparting movement to said dual carriage assembly along said multiple guide tracks, whereby said dual flap may be moved between a fully retracted position, wherein said dual flap completes the trailing edge contour of the airfoil section of said wing, and a fully extended position wherein said dual flap is displaced rearwardly and deflected downwardly relative to the chord plane of said airfoil section.

17. The combination of claim 16, further comprising: means for rigidly interconnecting said individual flap members in a fixed chordwise spaced apart relationship to define an aerodynamic slot therebetween when said actuating means moves said dual flap to said extended position.

18. The combination of claim 16, further comprising: means operatively interconnecting said individual flap members for variably controlling a chordwise spaced apart relationship therebetween when said actuating means moves said dual flap to said extended position.

19. The combination of claim 18, wherein said individual flap members comprise a fore-flap and an aft-flap, said fore-flap being pivotably connected to said first carriage, said control means comprising a cam track affixed to said fore-flap and a roller having its rotational axis fixed to said aft-flap, said roller bearing on said cam track as said actuating mean s moves said dual auxiliary airfoils to said extended position whereby the chordwise spacing between said fore-flap and said aft-flap may be varied.

20. The combination comprising:

(a) a high aspect-ratio flexible main wing of an aircraft;

(b) a wing trailing edge flap system being shaped to generally complete the trailing edge contour of the main wing airfoil section when said flap system is in a fully retracted position;

(c) a pair of support assemblies externally mounted to said main wing, said pair of support assemblies being geometrically similar, spaced apart spanwise beneath the trailing portion of the airCraft wing between the inboard and outboard portions of said flap system, each of said support assemblies comprising:

(i) a cantilever beam having its forward portion fixedly attached beneath the main wing structure of the aircraft and its rearward portion being cantilevered from said forward portion and extending in a streamwise aft direction beneath said flap system;

(ii) multiple guide cam track means integral with said cantilever beam and comprising a lower guide cam track and an upper guide cam track;

(iii) a dual carriage assembly comprising a fore-carriage, an aft-carriage and an interconnecting link for pivotably connecting said carriages in series alignment, both said fore-carriage and said aft-carriage being individually supported by rollers which constantly engage a separate cam track on said cantilever beam and provide separate cam track guidance and support to each of said carriages, said fore-carriage being in constant contact with said first lower guide cam track and said aft-carriage being in constant contact with said second upper guide cam track, said carriages being arranged in series alignment on said cantilever beam, and (d) actuation means capable of imparting movement to said dual carriage assembly along said multiple guide cam tracks, whereby said flap system may be moved between a fully retracted position, wherein said flap system completes the trailing edge contour of the main wing airfoil section, and a fully extended position relative to said main wing, wherein said flap system is displaced rearwardly and deflected downwardly relative to the chord plane of the main wing airfoil section, whereby said cantilever beam and said dual carriage assembly produces a flexible roller/track system for non-binding translational movement of said flap system.

21. The combination of claim 20, wherein said wing trailing edge flap system comprises a .dual flap and means for rigidly interconnecting the individual flap members of said dual flap in a chordwise spaced apart relationship to define an aerodynamic slot therebetween when said actuation means moves said flap system to said extended position.

22. The combination of claim 20, wherein said wing trailing edge flap system comprises a dual flap and means operatively interconnecting the individual flap members for variably controlling a chordwise spaced apart relationship therebetween when said actuating means moves said flap system to said extended position.

23. The combination of claim 22, wherein said comprises a fore-flap and an aft-flap, said fore-flap being pivotably connected to said first carriage, said control means comprising a cam track affixed to said fore-flap and a roller having its rotational axis fixed to said aft-flap, said roller bearing on said cam track as said actuating means moves said dual auxiliary airfoils to said extended position whereby the chordwise spacing between said fore-flap and said aft-flap may be varied.

* * * * *